(12) United States Patent
Witter

(10) Patent No.: US 7,282,074 B1
(45) Date of Patent: Oct. 16, 2007

(54) AUXILIARY DUST COLLECTION SYSTEM

(76) Inventor: Robert M. Witter, 150 Robineau Rd., Syracuse, NY (US) 13207

( * ) Notice: Subject to any disclaimer, the term of this patent is extended or adjusted under 35 U.S.C. 154(b) by 0 days.

(21) Appl. No.: 11/413,729

(22) Filed: Apr. 28, 2006

(51) Int. Cl.
*B01D 45/12* (2006.01)

(52) U.S. Cl. .............................. 55/300; 55/304; 55/337; 55/345; 55/346; 55/428; 55/385.1; 55/DIG. 18; 95/268; 451/87; 451/88; 451/453; 451/456

(58) Field of Classification Search ................. 55/300, 55/304, 337, 345, 346, 428, 385.1, DIG. 18; 95/268; 451/87, 88, 453, 456
See application file for complete search history.

(56) References Cited

U.S. PATENT DOCUMENTS

| | | | | |
|---|---|---|---|---|
| 2,575,148 A | * | 11/1951 | Vokes ........................... 55/300 |
| 3,485,671 A | * | 12/1969 | Stephens ........................ 134/7 |
| 3,899,311 A | * | 8/1975 | Rapp ............................ 55/283 |
| 4,581,050 A | * | 4/1986 | Krantz ........................ 55/315.2 |
| 5,045,098 A | * | 9/1991 | Poor ............................ 55/300 |
| 5,104,429 A | * | 4/1992 | Miller .......................... 55/293 |
| 5,746,795 A | * | 5/1998 | Witter .......................... 55/472 |
| 6,129,775 A | * | 10/2000 | Conrad et al. ................. 55/337 |
| 6,471,751 B1 | * | 10/2002 | Semanderes et al. ......... 95/271 |
| 6,833,016 B2 | * | 12/2004 | Witter .......................... 55/337 |
| 2006/0283158 A1 | * | 12/2006 | Kennedy ...................... 55/300 |

* cited by examiner

*Primary Examiner*—Duane Smith
*Assistant Examiner*—Minh-Chau T. Pham
(74) *Attorney, Agent, or Firm*—Bernhard P. Molldrem, Jr.

(57) ABSTRACT

An auxiliary dust collection system can be interposed between a sander or other dust producing tool and a vacuum source, e.g., shop vacuum. This auxiliary system has a cyclonic separator connected by a flexible hose to the tool and by another hose to the vacuum source. The cone of the separator is mounted onto the lid of a drum into which the dust precipitates. For a tool that has its own blower, the vacuum source can be omitted, and the air leaving the outlet duct of the separator can be filtered and returned to the ambient. A drop in silencer formed of a sleeve or tube of acoustic foam can be positioned into the inlet side of a filter cartridge following a cyclonic separator. The silencer absorbs a significant fraction of the process noise.

20 Claims, 8 Drawing Sheets

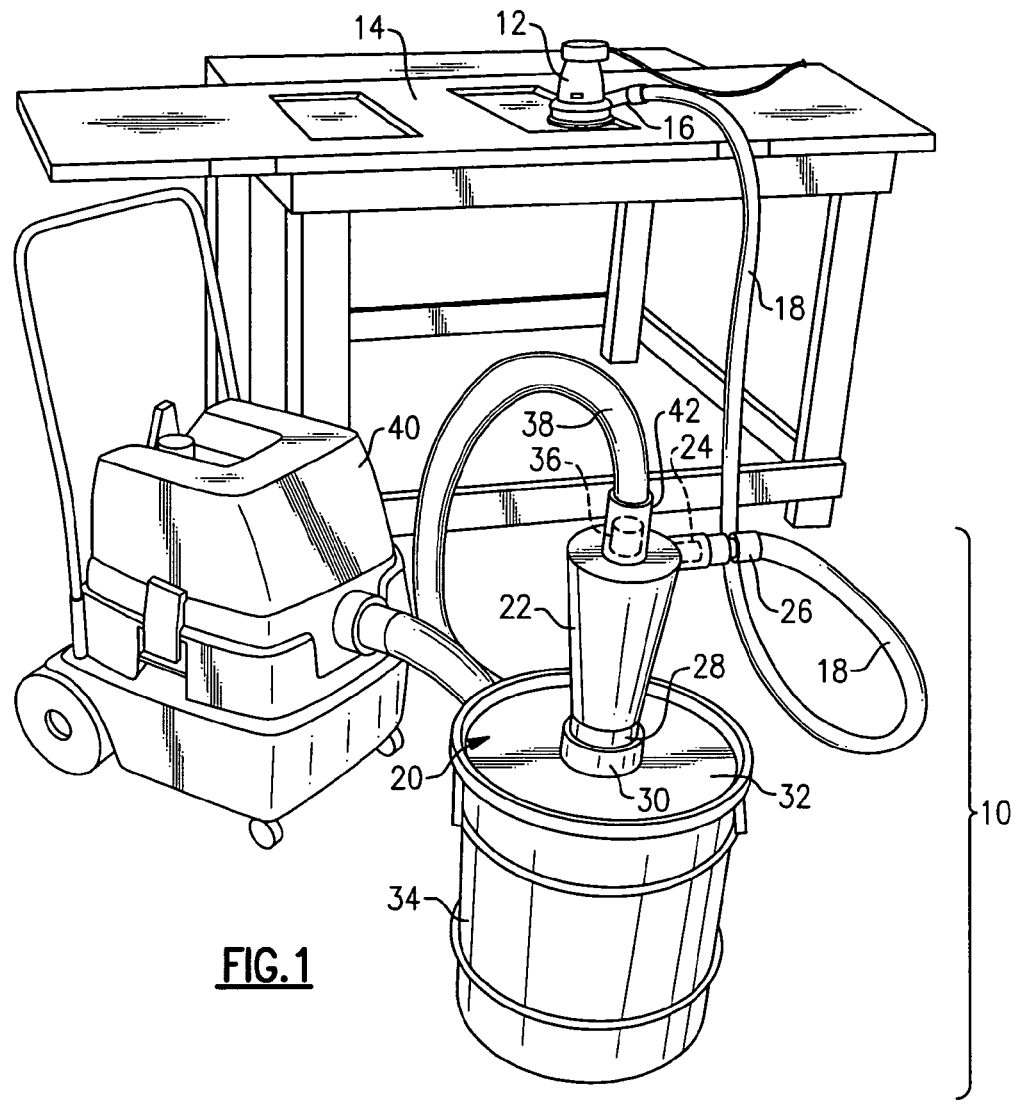
FIG. 1
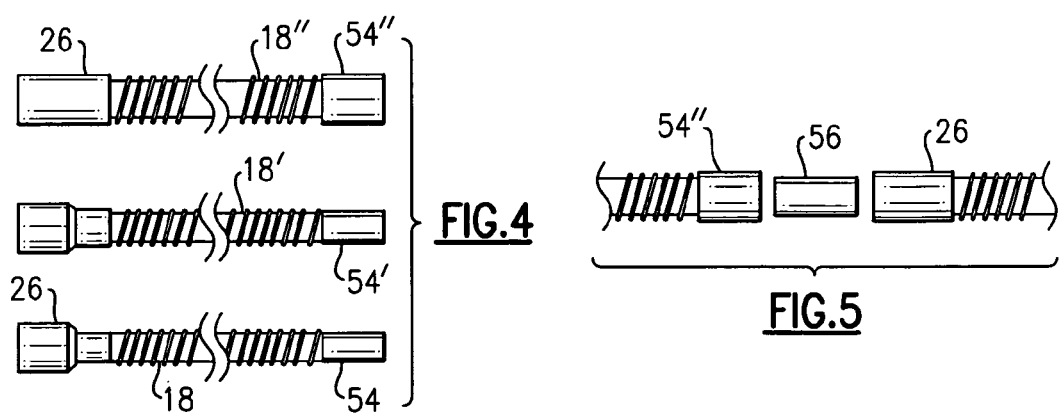
FIG. 4
FIG. 5

AUXILIARY DUST COLLECTION SYSTEM

BACKGROUND OF THE INVENTION

This invention is directed to devices and equipment for collecting bulk solids, for example, process dust coming from a dust generating tool, such as a sanding machine, where the dust is entrained in a flow of air from the source machine, and is separated out at the dust collection equipment where the dust precipitates into a drum, barrel, or similar container. The invention is more specifically directed to a compact and efficient device to be used between a tool and a vacuum source, e.g., shop vacuum, to separate and collect the dust from the airstream emerging from the tool before the air stream reaches the vacuum source. The invention is likewise concerned with a simple and straightforward dust separation assembly that can be associated with a tool that has a duct from with the air stream plus entrained dust particles proceed.

The invention is also concerned with a simple and straightforward silencer device that can be dropped in to the cylindrical filter of a cyclonic dust collection system to reduce the equipment noise by 3 to 8 dB.

For many types of machines for processing a workpiece, some means has to be provided to dispense with the grindings, chips, and particulate matter that is generated by the machine during operation. For example, in the case of wood working machines, such as sanders, joiners, and the like, wood that is removed from a workpiece has to be collected and removed from the work area so as to avoid either a breathing hazard for the workman or a fire hazard. More specifically, in the case of portable equipment, sanders and buffers, it is conventional to draw off the dust that is generated by the machines and then send the air that is carrying the dust into a filter bag arrangement, or to draw off the dust through a flexible hose or conduit. In such case, the conduit or hose extends from a dust outlet duct of the machine to a collection station. In the case of smaller equipment, e.g., palm sanders or trim sanders, the stream of air is pumped through a flexible hose conduit, with the entrained process dust, to a piece of equipment that provides suction and some filtering, e.g., a shop vacuum. This arrangement requires that the shop vacuum be cleaned and emptied regularly, to keep the wood dust from clogging the machine.

It has sometimes been desirable to collect bulk solids (e.g., dust) directly inside a drum or barrel, or in a plastic bag or liner in the drum.

An example of a cyclonic dust collection system is shown in U.S. Pat. No. 6,833,016, which is incorporated herein by reference. In the dust collection station described therein, the air flow and entrained process dust are drawn through a cyclone separator disposed atop a storage drum or barrel. The process dust falls into a durable plastic film bag or liner in the barrel, and the air then proceeds to a pumping and filtering arrangement, where the dust-free air is discharged back into the ambient environment. Means can be included to maintain a vacuum or negative pressure as a bag hold-down feature, to draw and hold the bag against the inside of the barrel. Then, when the bag has been filled to its capacity, the bag can be tied off and lifted out, which eliminates the need to dump the barrel. This also avoids exposure to the operators of the process dust when the collected dust is removed from the barrel for disposal.

In practice, no one has attempted to use a true cyclonic separator as an intermediate dust separation and collection device between the dust producing tool and the shop vacuum or other source of suction that accepts the dust and air stream from the tool. One proposed auxiliary dust collection receptacle, to be situated between a dust producing tool and a shop vacuum cleaner, is described in U.S. Pat. No. 6,027,541 to Siemers. In that proposed arrangement, a special lid is provided for a conventional plastic trash can. The lid has inlet and outlet sockets for hoses, one coming from the dust producing tool and the other going to the shop vacuum. The air flow is intended to produce a cyclonic air movement, with the dust precipitating from the air flow in the trash can. This arrangement is only mildly effective, as only about 50 percent of the airborne dust is separated out, with the remaining 50 percent continuing to the shop vacuum. Also, because the trash can itself is both the vortex chamber and the dust collection chamber, there is a low limit to the amount of dust that can be collected; at or above a partial fill level, the air stream picks up as much dust in the trash can as it drops.

This arrangement also does nothing to reduce the level of process noise from operation of the dust collection equipment.

OBJECTS AND SUMMARY OF THE INVENTION

Accordingly, it is an object of this invention to provide an efficient auxiliary dust collection arrangement that avoids the drawbacks of the prior art.

It is a more specific object to provide a dust collection arrangement that can be used in line between the dust producing tool and a suction source, such as a shop vacuum cleaner, that can separate out between 95% and 99% of the dust entrained in the air stream emerging from the tool.

It is another object to provide an auxiliary dust collection arrangement that is simple and straightforward in construction, highly reliable, and adaptable to a wide range of tools.

It is a further object of this invention to provide a dust collection system which does not significantly increase the system energy draw.

A still further object is to provide a drop-in silencer unit for a cyclonic dust collection system.

According to an aspect of the invention, an auxiliary dust collection arrangement is interposed between a dust producing tool, such as an electric sander or other woodworking tool, and a vacuum apparatus, e.g., a shop vacuum cleaner, for intercepting and removing dust carried in an air stream from the tool to the vacuum apparatus. In one preferred mode, the dust collection arrangement has a first flexible hose that extends from a discharge duct on the tool to an inlet pipe of a cyclonic separator. This separator has a generally conic body, i.e., which is wider at the top and narrowing to a nose or apex at its lower end. An air outlet pipe extends from the top of the conic body. The process dust in the air stream separates in the body and proceeds to the nose of the conic body, and the main air stream leaves via the air outlet pipe. There is a dust collection drum disposed beneath the cyclonic separator. This drum should have a generally rigid wall and an open top or mouth at its top end. A lid member fits onto the mouth opening and forms a seal there. A dust intake opening to which the nose of said conic body is fitted is centrally located on the lid member, and the dust that is separated from air stream in the cyclonic separator descends out of the nose or apex and into the drum. Then, a second flexible hose extends from the air outlet pipe to the vacuum apparatus. This separates out the vast majority of the dust, i.e., up to 99%, before the air stream reaches the vacuum.

The dust is collected inside the drum rather than in the vacuum cleaner, and this permits longer operation without clogging.

According to another preferred embodiment of this invention, a dust collection arrangement is provided for tools that have a built-in blower or air pump and a discharge duct where the air stream emerges, i.e., where the shop vacuum cleaner is not needed to cause the flow of the air stream. This arrangement intercepts and removes dust carried in the exhaust air stream. Here, the dust collection arrangement employs a flexible hose extending from the discharge duct on said tool and a cyclonic separator of the type employed in the first-described embodiment. This separator has a generally conic body, an inlet pipe onto which the flexible hose is fitted; and an air outlet atop the conic body. The dust in the air stream separates within the conic body and proceeds to the apex or nose of the conic body. As in the first embodiment, a dust collection drum is situated beneath the cyclonic separator, with the drum having a generally rigid wall and a mouth at its upper end. A lid member fits onto the mouth of the drum, and has a centrally disposed dust intake opening to which the nose of said conic body is fitted. As in the first embodiment, the dust that is separated from the air stream descends into collection drum. Because the air flow is provided from the sander or other tool, the shop vacuum cleaner (or other suction source) is not needed. Instead an air filter is mounted atop the cyclonic separator over its air outlet to catch residual dust in the air stream and pass filtered air back into the ambient.

A variety of flexible hoses can be furnished so as to fit the dust discharge ducts of any of a number of tools. These generally have a sleeve or cuff at the cyclone end that is a standard size (e.g., 1½ inch diameter), but the hose itself can be 1½ inch, 1¼ inch, or 1 inch, with a cuff of the appropriate diameter at the tool end. In the preferred arrangement, the second hose is 2 inch diameter, with suitable push-on cuffs on both ends to connect with the air outlet pipe of the cyclone separator and to the vacuum cleaner. In the second embodiment, where the air stream is driven from the tool blower, the filter can be a cylindrical cartridge filter, with a disk hold-down plate situated above cartridge and a threaded rod passing through the hold down plate into a threaded socket situated in the air outlet, or inside the cyclone conic body.

In addition, a drop-in silencer device may be provided specifically for use with a cyclonic dust collection system. The cyclonic separator has an air inlet pipe which receives, from a dust conduit, an air stream containing entrained dust particles. A drum is disposed beneath a nose of the separator and the dust particles descend into the drum. The air stream emerges from a discharge pipe atop the separator. A cylindrical air filter has an annular top surface with a round opening of a predetermined diameter leading into the filter. A fitting going to the top of the filter connects the discharge pipe to the top of the cylindrical air filter, where a clamp removably secures the fitting to the cylindrical filter. The drop-in silencer is formed of a sleeve of an acoustic foam material having a diameter to fit into the round opening, with an open bottom end situated within the cylindrical air filter. A transverse flange ring extends radially out from the acoustic foam sleeve at an upper end thereof to be secured between the fitting and the annular top surface of said filter. This flange ring favorably is formed, in part, of a flexible material capable of forming a seal between fitting and filter when they are clamped together. The acoustic foam material favorably has a thickness of about ¼ inch to ½ inch, and a textured surface on the interior (i.e., sound-facing surface) of the sleeve. Many suitable types of acoustic foams are available, which can be selected based on their sound attenuation spectrum, or absorption factors, as well as other factors. The silencers have diameters and lengths to match the cylindrical filter cartridges. These devices typically reduce the noise level by 2 to 8 dB. The term "acoustic foam" is intended here to be given a broad reading, and can be considered to cover other acoustic material such as fibrous open-textured material.

The above and many other objects, features, and advantages of this invention will become apparent from the ensuing detailed description of the preferred embodiments, which is illustrated in the accompanying Drawing.

BRIEF DESCRIPTION OF THE DRAWING

FIG. 1 is a perspective system view of vacuum system including an auxiliary dust separator according to one embodiment of this invention.

FIG. 4 shows an assortment of intake hoses that can be employed in this embodiment.

FIG. 5 shows two hoses being joined by a connector.

DETAILED DESCRIPTION OF A PREFERRED EMBODIMENT

Figure 2:
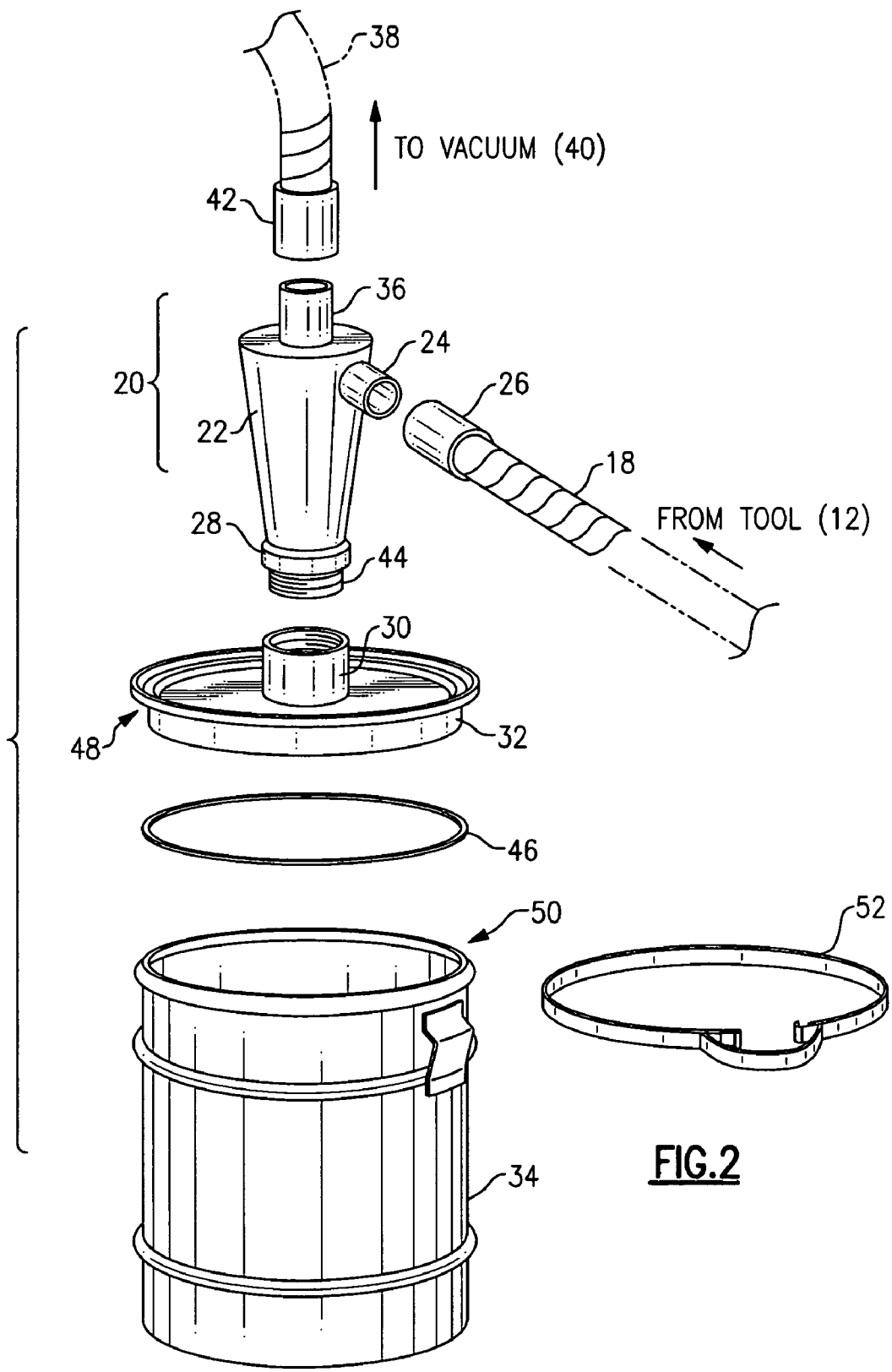
FIG. 2 is a and exploded view of the auxiliary dust separator of this embodiment.

Now with reference to the Drawing, FIG. 1 shows a woodshop application, which employs an auxiliary dust separation and collection device 10 of present invention. As illustrated, a wood sander device 12 is shown in use on a wood workpiece, e.g., a door 14 or article of furniture. The sander 12 has a dust exhaust duct 16, which is connected by an elongated flexible hose 18 to an intake of the auxiliary separation and collection device. Dust in the air stream emanating from the sander 12 (or from another tool or machine) is intercepted at the auxiliary device 10, in a cyclonic separator 20. This separator comprises a conic body 22, with an intake pipe 24 that is fitted with a connector or cuff 26 of the hose 18. The cuff is favorably a tubular push-on sleeve. The conic body has a nose or vertex 28 at its lower end where it is attached by means of a coupler ring 30 to a lid or cover 32 that is fitted onto a drum or barrel 34. A vortex pipe 36 extends up from within the conic body 22 and its upper end serves as outlet pipe. An outlet hose 38, i.e., another elongated flexible hose, extends to a suction inlet of a vacuum source, which in this arrangement is a shop vacuum cleaner 40. In other embodiments, the vacuum source could be a central vacuum system. A cuff 42 on the cyclone end of the hose 38 is push-fitted over the outlet pipe 36. A noise control device, i.e., silencer, can be employed with the vacuum cleaner 40 to reduce the noise level by a few dB.

As illustrated in better detail in FIG. 2, the cyclonic separator 20 has its nose or vortex 28 oriented downward, and incorporates a male threaded pipe nipple 44. The coupler ring 30 of the drum lid 32 is constituted as a female threaded nipple, such that the nose 28 of the conic body 22 is screwed into the coupler ring 30 and is held rigidly in place on the drum lid. The lid itself is favorably formed of steel or another durable rigid material, such as any of a variety of tough plastic resins. A seal ring 46, formed of a suitable elastomeric material, fits onto an outer flange 48 of the lid 32, and fits against an open mouth 50 at the upper rim of the barrel or drum 34. The drum in this embodiment has a rigid side wall, so as to withstand the system vacuum without collapsing or crushing. A circumferential clamp 52 may be used here to secure the lid 32 onto the upper rim of the drum 34.

Figure 3:
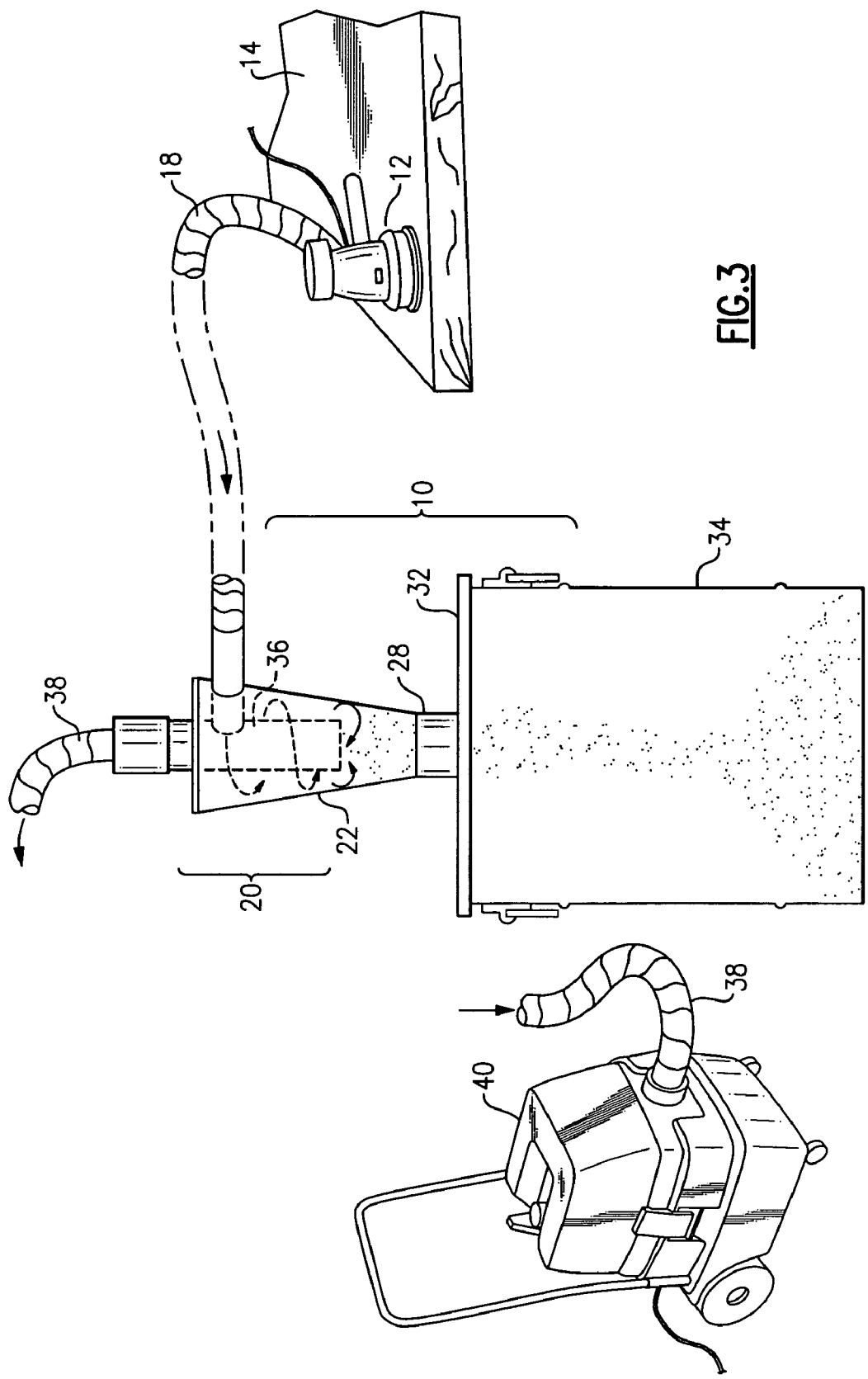
FIG. 3 is a partial cutaway view of the auxiliary dust separator for explaining its operation.

Normal operation of this embodiment may be explained with reference to FIG. 3.

As explained above, the auxiliary dust collection device 10 is interposed in the air stream between the sander or other dust producing tool 12 and the shop vacuum or other suction source 40. The vacuum cleaner 40 induces an air flow through the intake conduit 18 and cyclonic separator 20, and then via the outlet pipe 36 and outlet conduit 38 to the vacuum cleaner 40. The air stream or air flow is represented with arrows in this view. Entrained process dust in the air stream separates out by cyclonic action in the separator 20, and this dust then precipitates from the nose 38 into the drum 34. The action of the vacuum cleaner 40 creates a net negative pressure, relative to ambient, within the cyclonic separator 20 and the drum 34. The seal ring 46 serves to prevent leakage of air into the drum 34, which could interfere with the precipitation of dust into the drum, and would also reduce efficiency of operation. Also, because this system uses a generally rigid drum, rather than a flexible bag, the system provides a calm, dead space where the separated process dust can fall and leave the air stream. The separation efficiency of this system is rather high, and between 95% and 99% of the process dust from the tool separates out from the air stream into the drum 34, with only a small amount of residual dust remaining in the air stream, and going to the vacuum cleaner 40. Consequently, the shop vacuum cleaner 40 can be run continuously for an extended period of time without clogging.

A polyethylene bag liner may optionally be used in the drum or barrel to facilitate disposal of the collected dust. If so, a vacuum hold down feature may be employed.

A number of hose options are available, as explained with FIGS. 4 and 5. Each length of intake hose should have a cuff 26 that is of a standard 1.5 inch inside diameter, so as to fit onto the inlet pipe 24 of the cyclonic separator. As shown here, the hose 18 may be of a small diameter, e.g. 1.0 inch, with a 1.0 inch cuff 54 at the tool end; there may be an intermediate 1.25 inch hose 18' with a 1.25 inch cuff 54' as well as a large 1.5 inch hose 18" with a 1.5 inch cuff 54" to fit tool dust conduits of those sizes. The larger hose sizes may also be used for general cleaning. All hoses have at least one 1.5 inch cuff to connect to the cyclone inlet.

Figure 6:
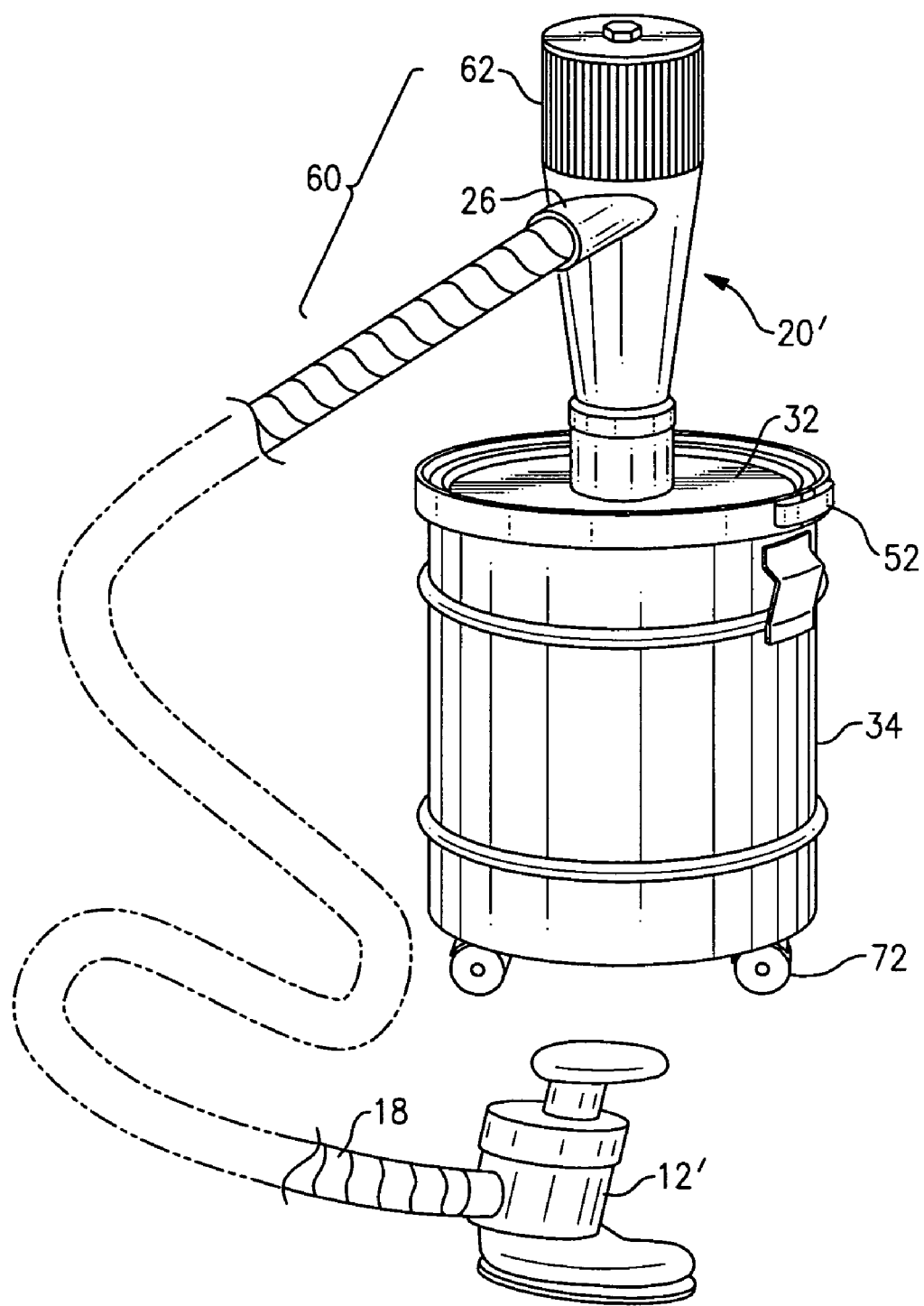
FIG. 6 is a perspective view of an alternative embodiment.

As shown in FIG. 6, a tubular coupler 56 may be used for extending the hose length. A 1.5 inch hose 18" is run from the cyclone, then the coupler is inserted into the cuff 54" and the length of hose 18 of the desired diameter is attached to run to the tool.

In a preferred arrangement, the cyclonic separator 20 is about sixteen inches tall, with the inlet pipe 24 being 1½ inches in diameter, and the outlet pipe 36 being 2 inches in diameter, with the hose 38 to the vacuum cleaner 40 being 2-inch flexible hose. In this preferred arrangement, the drum 34 is a ten gallon capacity metal drum of about 15 inch diameter. The overall height of the unit is about 31 inches. The hoses 18, 38 are wire-reinforced static dissipating hoses.

Figure 7:
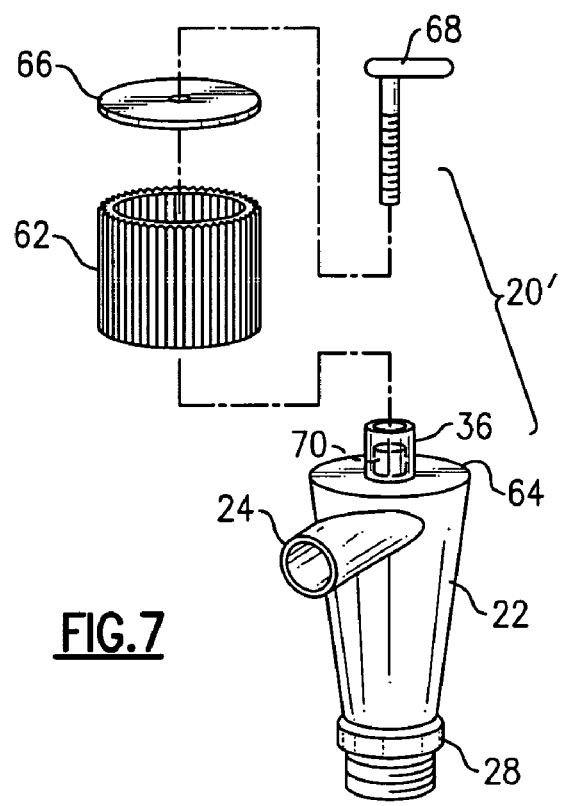
FIG. 7 is an exploded view of components of the alternative embodiment.
Figure 7A:
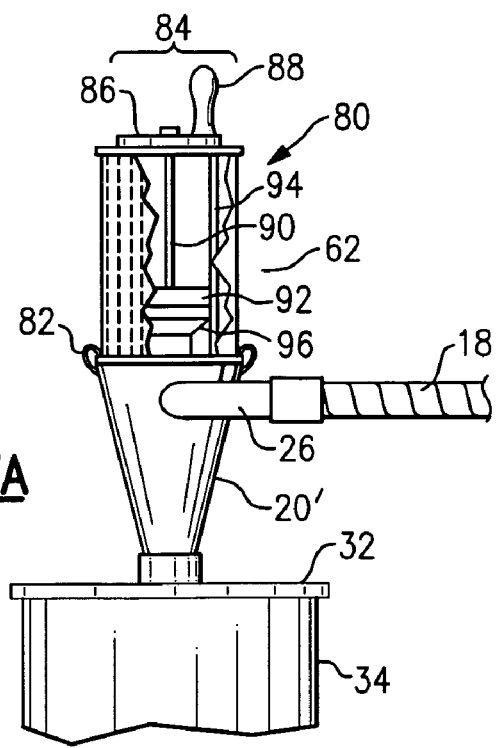
FIG. 7A shows a dust shaker arrangement employed in the embodiment of FIGS. 6 and 7.

An alternative arrangement of the dust collection device 60 is illustrated in FIGS. 6 and 7. This implementation is used with a tool 12', such as floor sanding edger, which has its own internal blower, so that the required air flow is produced by the tool. In this arrangement, the shop vacuum cleaner is not needed. Here, a cyclonic separator 20' has basically the same elements as in FIGS. 1 to 3, except that there is no hose or conduit connected with the unit's outlet pipe 36. As in the previous embodiment, the separator 20' has an inlet pipe 24 and a nose or apex 28 mounted onto the drum lid 32. The hose to the tool 12' is fitted to the inlet pipe 24. However, rather than going through the vacuum cleaner hose, the discharge air is instead exhausted into a filter cartridge 62, and thence into the ambient or room air. In this embodiment, the filter cartridge is a cylindrical pleated media high efficiency filter, e.g., a HEPA filter. The cylindrical filter cartridge 62 has its lower end seated onto a top surface 64 of the conic body 22 of the separator 20. A hold-down disk 66 fits against the top end of the filter cartridge 62, and this is held in place by a threaded rod 68 that twists into a nut 70 located within the conic body 22 along the axis of the outlet pipe.

As shown here, a ring clamp 52 secures the top or lid 32 against the mouth 50 of the drum 34. Here, because the tool 12' creates a positive pressure, there is a positive system pressure relative to ambient, and an overpressure inside the drum 34. The clamp 52 keeps the lid and ring seal closed against the drum, to keep dust from blowing out of the drum from under the lid.

Another optional feature are casters or wheels 72 for the drum 34, to allow the device 60 to be pulled along to follow the work, e.g., for the sanding of floors or woodwork. The device 60 does not require power, as all the air flow is provided from the tool.

A crank-operated dust shaker arrangement 80 (See FIG. 7B) can be employed to loosen the dust that collects on the inner part of the filter cartridge 62. In this case, there are clamps 82 at the base of the filter 62 to hold it to the top 64 of the conic body 22 of the separator. At the top of the filter cartridge is a crank 84, formed of a disk 86 and a handle 88, with a rod 90 descending into the interior of the filter cartridge. A tee member 92, formed of a flexible material, e.g., Teflon, extends outward from the rod 90, and its tips extend just into the pleats 94 on the inside of the filter cartridge 62. After a few hours of operation, some dust can collect on the inner surfaces of the filter cartridge. This can be knocked off from the inside by rotating the crank 84, after turning off the air flow. The tee member 92 snaps past each of the interior pleats 94, and this shaking action loosens the collected dust, and this dust then falls down through the vortex tube 36 and into the barrel or drum. In the case where there is a gap between the vortex tube and the inner pleats of the filter 62, a small flared flange 96, favorably made of a flexible, rubber-like material, can be fitted onto the top end of the vortex tube.

Figure 8:
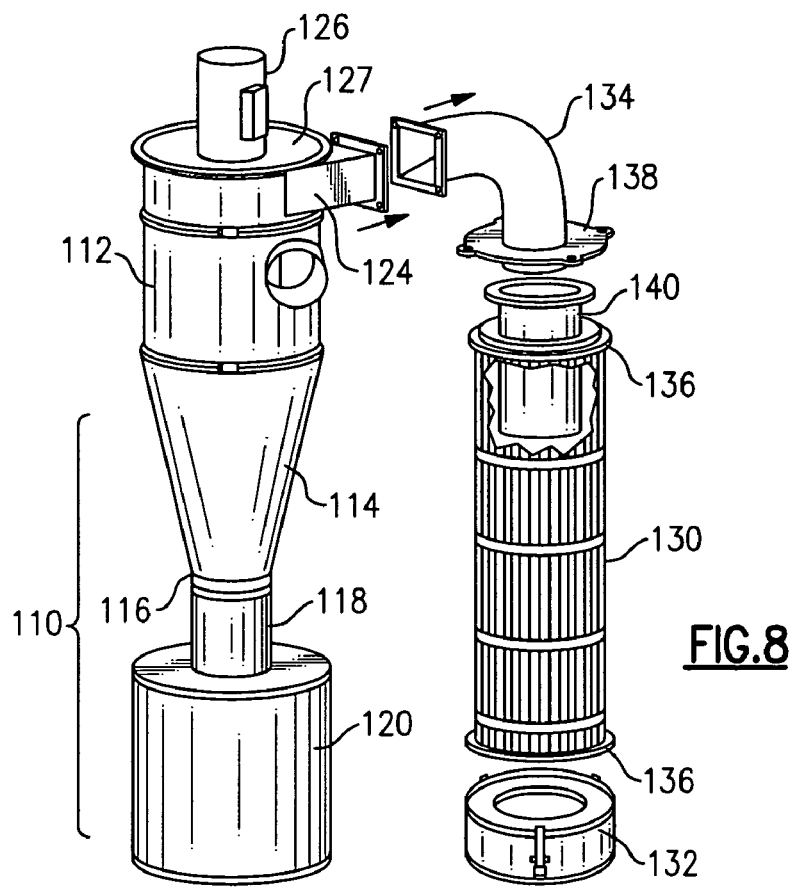
FIG. 8 is a perspective view of a dust separator and filter arrangement, with drop-in silencer according to an embodiment of this invention.
Figure 9:
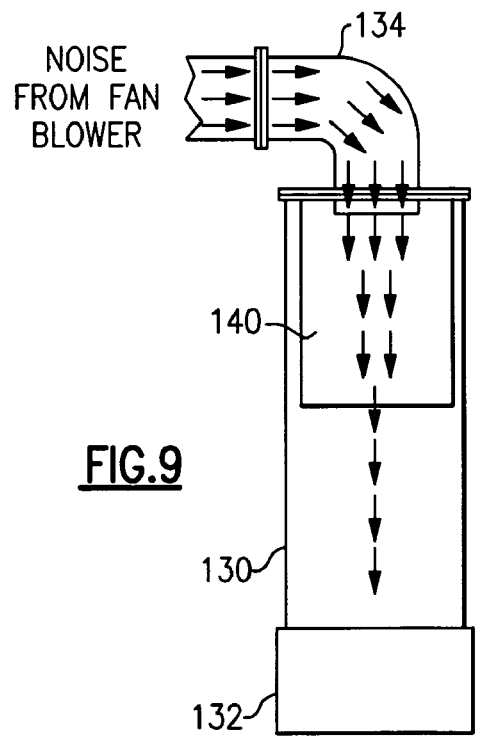
FIG. 9 is a schematic view of a portion of this embodiment.

A drop-in silencer according to an embodiment of the invention is shown with reference to FIGS. 8 and 9 and with further reference to FIGS. 10 to 13. The silencer can be used with a cyclonic separator dust collection and containment system, e.g., in a wood shop environment.

Here, a cyclonic dust collector 110 has an air intake 112 that is connected downstream of dust producing tool (or tools), which introduces a stream of dust-laden air into a conic body 114 where the dust separates from the air stream by cyclonic action. A nose or vortex 116 at the bottom is connected by a conduit 118 to a dust collection drum 120. The dust that separates from the air stream precipitates out via the nose 116 and settles into the drum 120. A centrifugal fan or blower 122 at the top of the cyclonic separator creates an air flow out from the cyclone and through an exhaust port 124. A single-phase AC induction motor 126 powers the blower 122.

The exhaust air flow passes from the exhaust port 124 and through a high performance cartridge filter 130 into the ambient room air. About 95 to 99% of the dust is removed from the air stream by the cyclonic separator, and the residual dust is caught in the filter 130. The cylindrical cartridge filter 130 has its axis arranged vertically, with a lower end seated on a canister-shaped base or pedestal 132. A connector 134 that receives the exhaust air flow from the exhaust port 124 is fastened down to an upper end of the cartridge filter. The filter 130 is of the type having pleated filter material forming cylindrical side wall or walls, and has annular top and bottom end walls 136, each with a circular opening. A flange 138 on the connector 134 clamps to the top end wall 136 of the filter, so that the exhaust air is ducted into the interior of the cartridge filter.

The fan or blower 122 produces a significant level of noise, which can be a nuisance in a workplace environment. In order to reduce process noise, a drop-in silencer 140 is employed, as illustrated, to reduce the volume of the noise. The silencer 140 is formed of a tube or cylinder 142 of an acoustic foam. A transverse flange 144 extends radially out from the top end of the tube 142. This can be made at least partly of a semi-flexible compressible material so as to form a seal between the flange 138 and the top end 136 of the filter cartridge. As illustrated by arrows in FIG. 9, noise from the blower 124 is ducted with the air flow into the cartridge 130, and can escape from there into the workplace. However, the silencer 140 absorbs a significant amount of the noise, especially at the more annoying wavelengths above 2 KHz.

Figure 10:
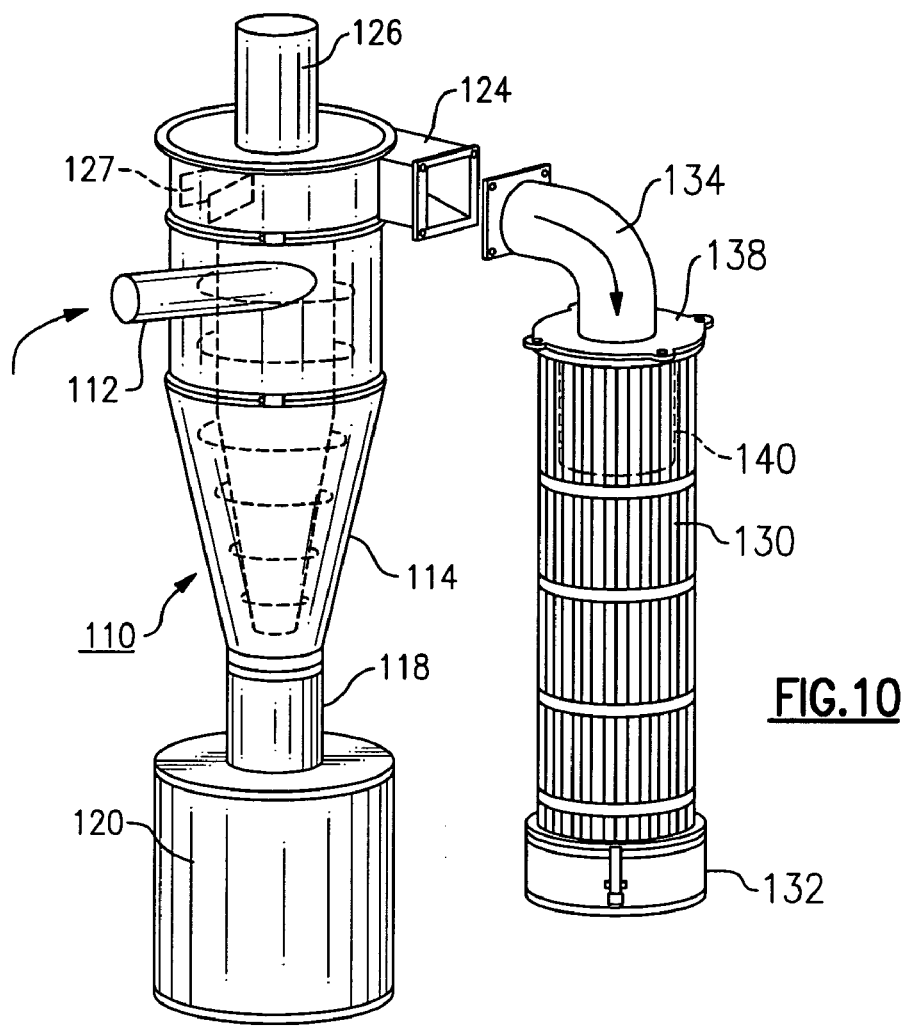
FIG. 10 is another schematic view showing operation of the dust separator, filter and silencer of this embodiment.

As shown in FIG. 10, dust that is entrained in the air flow from dust producing tools is separated out in the conic body 114 of the cyclone, and the dust fall from the nose 116 into the drum or barrel 120. The fan or blower 122 that drives the air flow produces significant noise levels, and the silencer 140 serves to trap and absorb this noise when it enters the filter cartridge.

Figure 11:
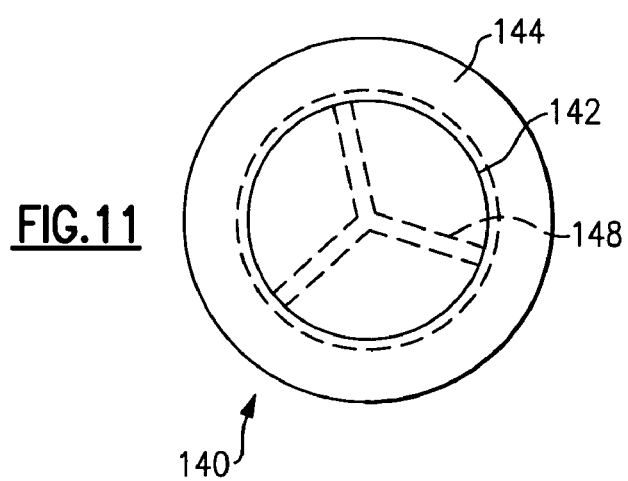
FIG. 11 shows a top plan view of the silencer of this embodiment.
Figure 12:
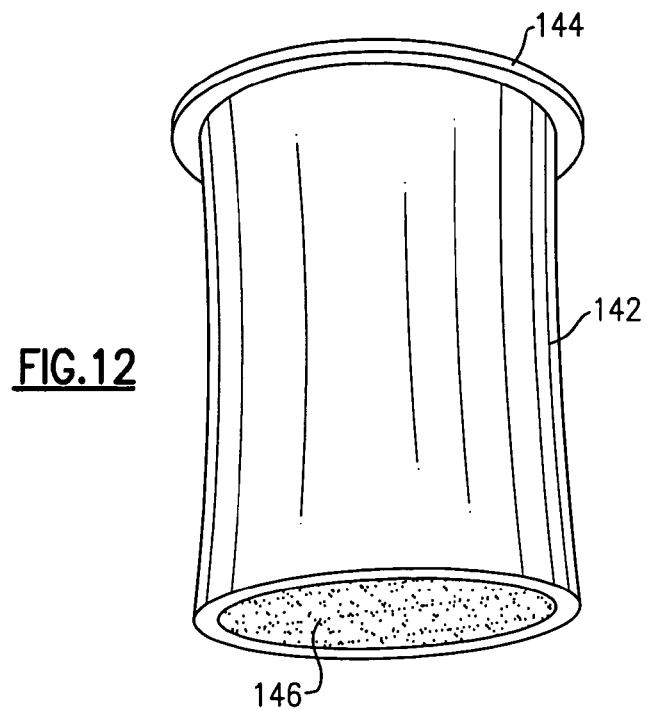
FIGS. 12 and 13 are perspective views illustrating the drop in silencer of this embodiment.
Figure 13:
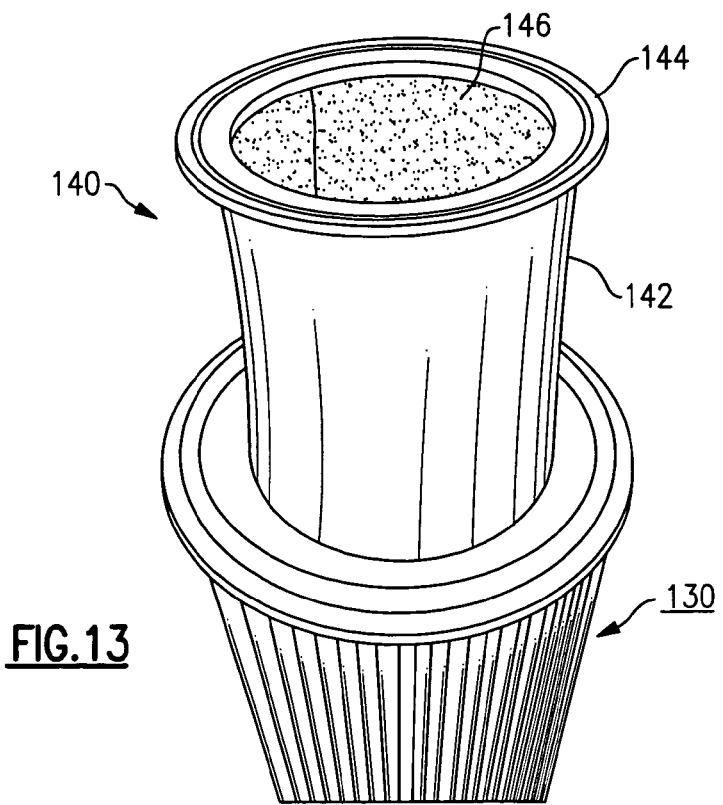

As shown in FIGS. 11, 12, and 13, the silencer is generally cylindrical in shape, and conforms with the interior diameter of the cylindrical filter cartridge 130. The acoustic foam has a textured surface 146 at the interior side of the tube, i.e., on the sound-facing side. The acoustic foam may have a thickness of ¼ inch, ⅜ inch or ½ inch. The tube length of the silencer 140 is about one quarter to a third the length of the cartridge 130. The silencer is effective in reducing the noise levels by about 2 dB to 8 dB, at least for frequencies above about 2 KHz. Optionally, baffles 148 (FIG. 11) may be formed in the interior of the acoustic foam tube to enhance its noise suppression. The baffles may be formed of the same acoustic foam, or may be formed of other materials.

While the invention has been described hereinabove with reference to a few preferred embodiments, it should be apparent that the invention is not limited to such embodiments. Rather, many variations would be apparent to persons of skill in the art without departing from the scope and spirit of this invention, as defined in the appended Claims.

I claim:

1. In combination, a dust producing source of the type having a dust discharge duct; a first flexible hose extending from the discharge duct of said source; a shop vacuum machine for providing suction at a suction port to draw an airflow therefrom and to collect and store dust therein and pass the air from said airflow therefrom to the ambient; a second flexible hose extending to the suction port of said shop vacuum machine; and an auxiliary dust collection arrangement interposed between the dust producing source and said shop vacuum machine for intercepting and removing dust carried in the airflow from the source to the shop vacuum machine; the auxiliary dust collection arrangement comprising a) a cyclonic separator having a conic body, a vortex pipe that extends up from within said conic body, an inlet pipe onto which said first flexible hose is removably fitted, and an air outlet pipe atop said conic body onto which said second flexible hose is removably fitted; such that dust carried in the airflow that arrives in said first flexible conduit separates in said conic body and proceeds to a lower nose of said conic body;

b) a dust collection drum disposed beneath said cyclonic separator, the drum having a generally rigid wall and a mouth at its upper end; and c) a lid sealably fitting onto the mouth of the drum, and having a central dust intake opening which connects to and supports the nose of said conic body, such that the dust separated from said airflow descends into said drum.

2. Auxiliary dust collection arrangement according to claim 1 comprising a clamp to hold said lid onto a rim at the mouth of said drum.

3. Auxiliary dust collection arrangement according to claim 2 wherein said clamp includes a ring clamp.

4. Auxiliary dust collection arrangement according to claim 1 wherein a dust conduit connects the nose of the conic body to said dust intake opening.

5. Auxiliary dust collection arrangement according to claim 1 wherein said nose includes a male threaded nipple and the dust intake opening of said lid includes a female threaded member into which said male threaded nipple is screwed.

6. Auxiliary dust collection arrangement according to claim 1 wherein the conic body of said cyclonic separator is rigidly supported on said lid.

7. Auxiliary dust collection arrangement according to claim 1 wherein said first flexible hose includes a tubular push-on sleeve removably fitted onto said inlet pipe.

8. Auxiliary dust collection arrangement according to claim 1 wherein said second flexible hose includes a tubular push-on sleeve removably fitted onto said air outlet pipe.

9. In combination, a dust producing tool of the type of tool which includes a blower and a discharge duct from which an exhaust air stream emerges in which production dust is entrained, and a dust collection arrangement for intercepting and removing the dust carried in said exhaust air stream, the dust collection arrangement operating without any vacuum source downstream thereof; the dust collection arrangement comprising a. a flexible hose extending from the discharge duct on said tool;
b. a cyclonic separator having a conic body, an inlet pipe onto which said flexible hose is fitted, a vortex pipe that extends up from within said conic body, and an air outlet atop said conic body; such that dust in the air stream separates in said conic body and proceeds to a lower nose of said conic body;
c. a dust collection drum disposed beneath said cyclonic separator, the drum having a generally rigid wall and a mouth at its upper end;
d. a lid sealably fitting onto the mouth of the drum, and having a central dust intake opening to which the nose of said conic body connects, with said drum and said conic body having a positive pressure relative to ambient, such that the dust separated from said air stream descends into said drum; and
e. an air filter mounted directly atop said cyclonic separator over said air outlet to catch residual dust in said air stream and to pass filtered air directly back into the ambient.

10. Dust collection arrangement according to claim 9 wherein said air filter includes a generally cylindrical filter cartridge, with a hold-down plate situated above said cartridge and a threaded rod passing through said hold down plate into a threaded socket situated in said air outlet.

11. Dust collection arrangement according to claim 9 comprising a clamp to hold said lid onto a rim at the mouth of said drum.

12. Dust collection arrangement according to claim 11 wherein said clamp includes a ring clamp.

13. Dust collection arrangement according to claim 9 wherein a dust conduit connects the nose of the conic body to the dust intake opening of said lid.

14. Dust collection arrangement according to claim 9 wherein said nose includes a male threaded nipple and the dust intake opening of said lid includes a female threaded member into which said male threaded nipple is screwed.

15. Dust collection arrangement according to claim 9 wherein the conic body of said cyclonic separator is rigidly supported on said lid.

16. Dust collection arrangement according to claim 9 wherein said flexible hose includes a tubular push-on sleeve removably fitted onto said inlet pipe.

17. Dust collection arrangement according to claim 9 wherein said filter cartridge is a cylindrical pleated filter cartridge, and further comprising a crank-operated dust shaker arrangement extending into the filter cartridge for loosening dust that collects on inner parts of the filter cartridge, such that the dust can be removed from the filter cartridge without removing the latter from the top of the cyclonic separator.

18. Dust collection arrangement according to claim 17, wherein said dust shaker arrangement includes a crank situated above said filter cartridge, a rod extending from the crank into an interior of the cartridge, and a tee member on said rod that extends radially out to contact pleats of said cylindrical filter cartridge.

19. Dust collection arrangement of claim 1, wherein said inlet tube has a diameter of substantially one-and-one-half inches, and said outlet tube has a diameter of substantially two inches.

20. Dust collection arrangement of claim 1, wherein said first and second flexible hoses are wire-reinforced, static dissipating hoses.

* * * * *

(12) EX PARTE REEXAMINATION CERTIFICATE (7682nd)
United States Patent
Witter

(10) Number: US 7,282,074 C1
(45) Certificate Issued: Aug. 10, 2010

(54) AUXILIARY DUST COLLECTION SYSTEM

(76) Inventor: Robert M. Witter, 150 Robineau Rd., Syracuse, NY (US) 13207

Reexamination Request:
No. 90/009,553, Aug. 6, 2009

Reexamination Certificate for:
Patent No.: 7,282,074
Issued: Oct. 16, 2007
Appl. No.: 11/413,729
Filed: Apr. 28, 2006

(51) Int. Cl.
*B01D 45/12* (2006.01)

(52) U.S. Cl. .............................. 55/300; 55/304; 55/337; 55/345; 55/346; 55/428; 55/385.1; 55/DIG. 18; 95/268; 451/87; 451/88; 451/453; 451/458

(58) Field of Classification Search ........................ None
See application file for complete search history.

(56) References Cited

U.S. PATENT DOCUMENTS

| | | | |
|---|---|---|---|
| 5,746,795 A | 5/1998 | Witter | 55/472 |
| 5,947,320 A | 9/1999 | Bordner et al. | 220/321 |
| 6,446,661 B2 | 9/2002 | Armenia et al. | 137/312 |
| 6,833,016 B2 | 12/2004 | Witter | 55/337 |
| 7,282,074 B1 | 10/2007 | Witter | 55/300 |

OTHER PUBLICATIONS

Webpages Brochure: Mini–Cyclone Dust Collector on www.woodworkforum.com by Wayne Davy on Jul. 26–27, 2003.

*Primary Examiner*—Terrence R Till

(57) ABSTRACT

An auxiliary dust collection system can be interposed between a sander or other dust producing tool and a vacuum source, e.g., shop vacuum. This auxiliary system has a cyclonic separator connected by a flexible hose to the tool and by another hose to the vacuum source. The cone of the separator is mounted onto the lid of a drum into which the dust precipitates. For a tool that has its own blower, the vacuum source can be omitted, and the air leaving the outlet duct of the separator can be filtered and returned to the ambient. A drop in silencer formed of a sleeve or tube of acoustic foam can be positioned into the inlet side of a filter cartridge following a cyclonic separator. The silencer absorbs a significant fraction of the process noise.

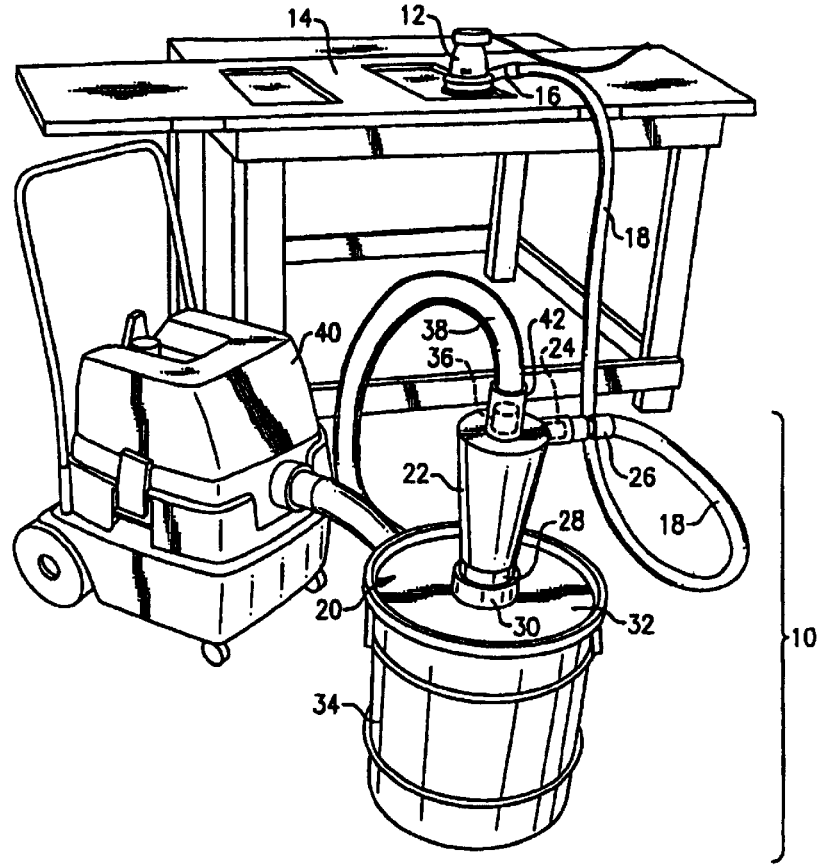

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1-8 is confirmed.

New claims 21-23 are added and determined to be patentable.

Claims 9-20 were not reexamined.

*21. Auxiliary dust collection arrangement according to claim 1 wherein said inlet pipe penetrates said conic body of said cyclonic separator.*

*22. Auxiliary dust collection arrangement according to claim 4 wherein said dust conduit includes an annular mounting member affixed onto a lower end thereof.*

*23. Auxiliary dust collection arrangement according to claim 1, wherein said inlet pipe includes means for accepting intake hoses of a plurality of different standard inside diameters.*

\* \* \* \* \*